A. W. OLDS.
MOVEMENT INDICATING APPARATUS FOR VEHICLES.
APPLICATION FILED JULY 1, 1916.
1,239,511.                    Patented Sept. 11, 1917.
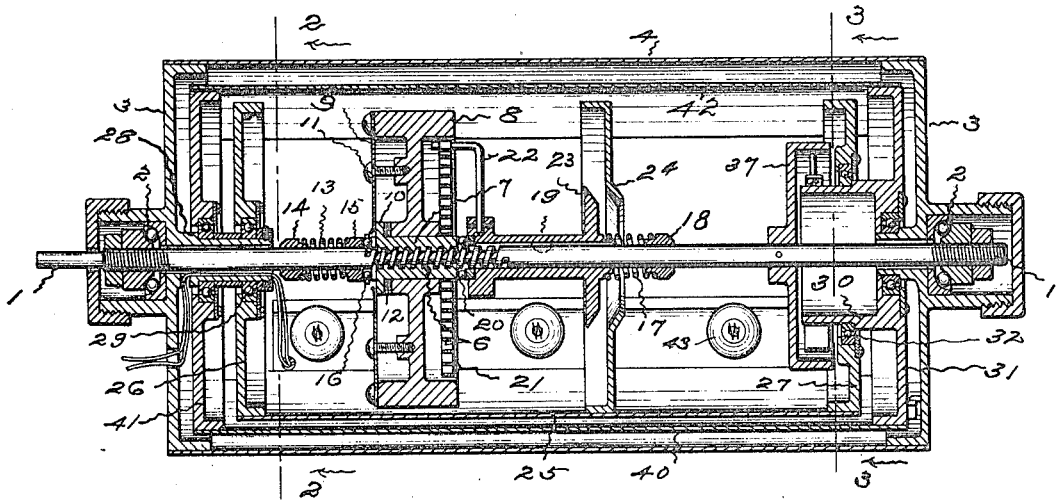
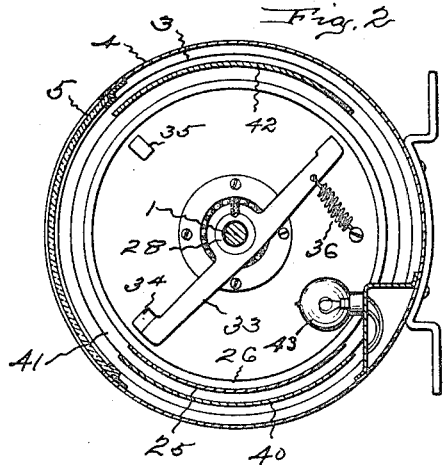
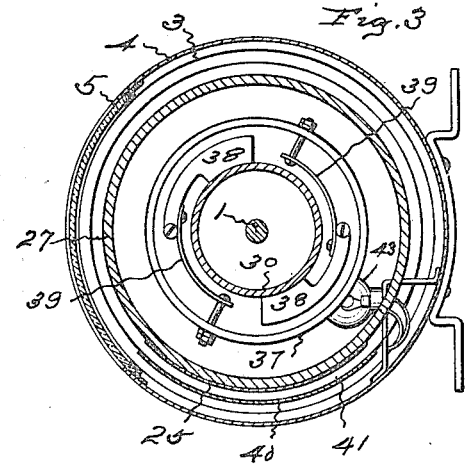
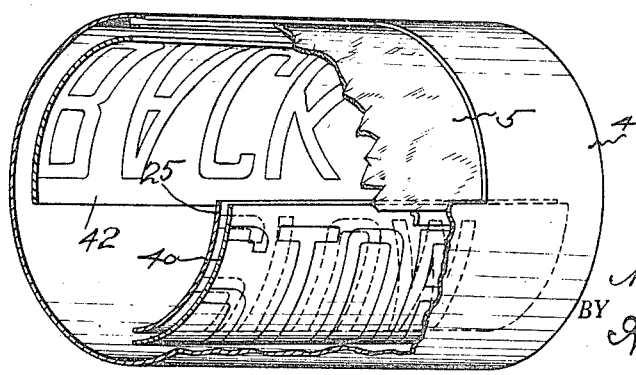
INVENTOR.
Alfred W. Olds
BY Harry P. Williams
ATTORNEY.

UNITED STATES PATENT OFFICE.

ALFRED W. OLDS, OF WINDSOR, CONNECTICUT.

MOVEMENT-INDICATING APPARATUS FOR VEHICLES.

1,239,511.     Specification of Letters Patent.     Patented Sept. 11, 1917.

Application filed July 1, 1916. Serial No. 107,082.

*To all whom it may concern:*

Be it known that I, ALFRED W. OLDS, a citizen of the United States, residing at Windsor, in the county of Hartford and State of Connecticut, have invented a new and useful Improvement in Movement-Indicating Apparatus for Vehicles, of which the following is a specification.

This invention relates to a device which is designed to be applied to pleasure and commercial automobiles, trolley and tram cars and similar vehicles that are run on public streets and highways particularly in communities where the traffic is likely to be congested, as in cities and towns.

The object of the invention is to provide an apparatus which may be readily applied to such a vehicle at the rear, or front, or both as desired, that will automatically indicate any reduction in the speed of the vehicle, will indicate a stop when the vehicle is about to or does come to rest, and also will indicate when the vehicle is backing.

In attaining this end the apparatus is provided with a sign, preferably bearing the word "Slow," which is automatically exposed when the speed of the vehicle is being reduced, and is provided with a sign, preferably bearing the word "Stop," that will be exposed when the vehicle comes to rest, and with a sign, preferably bearing the word "Back," that shows when the vehicle is moving rearward. To effect this a shaft which is designed to be connected with some running part of the vehicle or motor is arranged with means that actuate the indicating signs according to the changes of the rate of speed of the shaft, or changes of direction of rotation of the shaft, these actuations being accomplished as a result of differences in rate of speed between, or direction of motion of, the shaft and parts between the shaft and the indicating signs.

Figure 1 of the accompanying drawings shows a central longitudinal section of a form of the apparatus. Fig. 2 shows a transverse section on the plane indicated by the dotted line 2—2 on Fig. 1 looking in the direction indicated by the arrows. Fig. 3 shows a transverse section on the plane indicated by the dotted line 3—3 on Fig. 1 looking in the direction indicated by the arrows. Fig. 4 is a perspective view with portions broken away showing the relation of the casing and the indicating signs.

In the device illustrated the operating shaft 1, which is designed to be connected with any convenient rotating part of the vehicle and be geared to turn at suitable speed, is supported by anti-friction bearings 2 in the heads 3 of the casing 4, which is desirably cylindrical and has a transparent window 5 in one side.

A portion of the shaft is provided with a screw thread 6 and fitting this thread is a nut 7. On the nut is a fly wheel 8. In the form shown the fly wheel is loosely mounted on the nut and is frictionally held thereto by the pressure of leaf springs 9 that at one end are fastened to the fly wheel and have their other ends bearing against the flange 10 at the end of the nut. Screws 11 are arranged to regulate the tension of the springs and a friction washer 12 is located between the end of the hub of the fly wheel and the flange at the end of the nut.

The nut is retained in normal position on the threaded part of the shaft by yielding means. At one side a spring 13 is arranged to thrust between a collar 14 fixed to the shaft and a collar 15 that slides on the shaft, an anti-friction thrust bearing 16 being interposed between the collar 15 and the flanged end of the nut. At the other side a spring 17 is arranged to thrust between a collar 18 fixed on the shaft and a sleeve 19 that is splined on the shaft, an anti-friction thrust bearing 20 being interposed between the end of the sleeve and the nut. The nut which turns on the thread on the shaft and the sleeve which is splined on the shaft are connected by a coil spring 21 that has one end fastened to the nut and the other end fastened to a pin 22 which projects from the sleeve. On the end of the sleeve opposite the pin is a disk 23 which forms the male member of a clutch. Arranged adjacent to this is a disk 24 which forms the female member of a clutch. The disk 24 is secured to the segmental plate 25 that is fastened at one end to a disk 26 and at the other end to a disk 27. This plate preferably bears the word "Slow." The disk 26 is mounted on the hub 28 of one of the casing heads 3, anti-friction bearings 29 being interposed. The disk 27 is mounted on the hub 30 of the disk 31, anti-friction bearings 32 being interposed. When the shaft and the fly wheel on the nut are turning at the same speed the nut remains in normal position with the clutch parts disengaged. Whenever the speed of the shaft drops the momentum of the fly wheel momentarily tends to keep the nut turning faster than the shaft, and this causes the nut to so advance along the screw thread as to engage the clutch parts. When the clutch parts are engaged the rotation of the shaft turns up the plate 25 so that the word "Slow" will be exposed through the window in the casing, thus indicating that the speed of the vehicle is being reduced. Fastened on the head hub 28 is a stop arm 33 and projecting from the inside of the disk 26 are stop lugs 34 and 35. A spring 36 is connected between the stop arm and the disk in such manner as to normally cause the stop lug 34 to be held in engagement with one end of the stop arm. With these parts in this position the "slow" sign is turned down away from the window. When the clutch parts are engaged and the "slow" sign is turned up the stop lug 35 engages the other end of the stop arm so that the sign will be directly back of the window. With the speed of the shaft and the speed of the fly wheel equal, no matter what the speed of the vehicle, the nut remains in normal position with the "slow" sign at the bottom and not exposed, but whenever the vehicle slows down, no matter what its speed, the "slow" sign is turned up so as to be exposed through the window of the casing.

Fastened to the shaft is a flanged disk 37, and mounted in this are weights 38, these weights being connected with the disk flange by springs 39. The springs normally cause the weights to bear upon the hub 30 of the disk 31. A segmental plate 40 is fastened at one end to the disk 31 and at the other end to the disk 41. On this plate is preferably the word "Stop." A segmental plate 42 is also fastened to the disks 31 and 41. On this plate is preferably the word "Back." When the machine is running forwardly and the shaft is rotating centrifugal action relieves the pressure of the weights against the hub 30 of the disk 31 and the parts are held with the "stop" sign below the window and the "back" sign above the window. As the shaft slows down and centrifugal force is reduced the weights tend to bind on the hub of the disk and turn the "stop" sign up so that it is exposed through the window. If the machine backs the reverse movement of the shaft turns the "stop" and "back" signs down so the latter shows through the window. When the machine starts up forwardly and centrifugal action again comes into play the stop sign is turned down from back of the window.

Lamps 43 may be arranged in the casing for illuminating the signs, and these lamps or the signs may be colored red if desired to indicate danger at night.

The invention claimed is:

1. A movement indicating apparatus for vehicles comprising a casing, a threaded shaft rotatably mounted in the casing, a weighted nut fitting the threaded portion of the shaft, an indicator movably mounted within the casing, and a clutch between the nut and the indicator, said clutch being engaged and disengaged by variations in the relative speeds of rotation of the shaft and nut.

2. A movement indicating apparatus for vehicles comprising a casing, a threaded shaft rotatably mounted in the casing, a nut fitting the threaded portion of the shaft, a fly wheel mounted on the nut and frictionally connected thereto, an indicator movably mounted in the casing, and a clutch between the nut and the indicator, said clutch being engaged and disengaged by variations in the relative speeds of rotation of the shaft and nut.

3. A movement indicating apparatus for vehicles comprising a casing, a threaded shaft rotatably mounted in the casing, a nut fitting the threaded portion of the shaft, a clutch adapted to be engaged and disengaged by the movements of the nut along the shaft, and a movable indicator connected with one member of the clutch.

4. A movement indicating apparatus for vehicles comprising a casing, a threaded shaft rotatably mounted in the casing, a nut fitting the threaded portion of the shaft, a fly wheel mounted on the nut, a clutch, a yielding connection between the nut and one member of the clutch, and a movable indicator connected with the other member of the clutch.

5. A movement indicating apparatus for vehicles comprising a casing, a threaded shaft rotatably mounted in the casing, a nut fitting the threaded portion of the shaft, springs holding the nut in normal position on the shaft, a movable indicator, and a clutch with one member connected with the nut and the other member connected with the indicator.

6. A movement indicating apparatus for vehicles comprising a casing, a threaded shaft rotatably mounted in the casing, a nut fitting the threaded portion of the shaft, a movable "slow" indicator, a clutch with one member connected with the nut and the other member connected with said "slow" indicator, a movable "stop" indicator, and a clutch with one member connected with the shaft and the other member connected with said "stop" indicator.

7. A movement indicating apparatus for vehicles comprising a casing, a threaded shaft rotatably mounted in the casing, a nut fitting the threaded portion of the shaft, a fly wheel frictionally mounted on the nut, springs holding the nut and fly wheel in normal position, a "slow" sign, a clutch with one member connected with the "slow" sign and the other member yieldingly connected with the nut, a "stop" sign, and a clutch with one member connected with the "stop" sign and the other member connected with the shaft.

8. A movement indicating apparatus for vehicles comprising a casing, a shaft rotatably mounted in the casing, a fly wheel loosely mounted on the shaft, said fly wheel being rotated forwardly from said shaft and adapted to run ahead of the shaft, a rotatable sleeve movable longitudinally of the shaft, an indicating sign, and means between the sleeve and the sign adapted to be engaged and disengaged by changes in the relative speeds of rotation of the shaft and fly wheel for operating the sign.

9. A movement indicating apparatus for vehicles comprising a casing, a shaft rotatably mounted in the casing, a fly wheel loosely mounted on the shaft, said fly wheel being rotated forwardly from said shaft and adapted to run ahead of the shaft, an indicating sign, and a clutch arranged between the shaft and the sign and designed to be engaged and disengaged by changes in the relative speeds of rotation of the shaft and fly wheel for operating the sign.

ALFRED W. OLDS.